United States Patent
Weber et al.

(10) Patent No.: US 6,689,414 B2
(45) Date of Patent: *Feb. 10, 2004

(54) METHOD OF PROTECTING GLASS SUBSTRATE SURFACES

(75) Inventors: Andreas Weber, Hildesheim (DE); Reiner Mauch, Guldental (DE); Roland Buerkle, Kirchentellinsfurt (DE); Andreas Berndt, Oldenburg (DE); Dirk Schlatterbeck, Zürich (CH); Marten Walther, Engelstadt (DE); Inka Henze, Udenheim (DE)

(73) Assignee: Schott Glas, Mainz (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 110 days.

This patent is subject to a terminal disclaimer.

(21) Appl. No.: 09/565,725

(22) Filed: May 5, 2000

(65) Prior Publication Data

US 2002/0136907 A1 Sep. 26, 2002

Related U.S. Application Data

(63) Continuation-in-part of application No. 09/504,607, filed on Feb. 15, 2000, now Pat. No. 6,491,972.

(30) Foreign Application Priority Data

Feb. 16, 1999 (DE) .......................................... 199 06 333

(51) Int. Cl.⁷ .............................................. B65B 33/00
(52) U.S. Cl. ........................ 427/154; 428/332; 428/442
(58) Field of Search .................. 428/332, 442; 427/154

(56) References Cited

U.S. PATENT DOCUMENTS

| | | | |
|---|---|---|---|
| 4,053,666 A | 10/1977 | Taylor | 428/213 |
| 5,026,597 A | * 6/1991 | Franz et al. | 428/323 |
| 5,550,182 A | 8/1996 | Ely | 524/557 |
| 6,233,972 B1 | * 5/2001 | Foster et al. | 65/60.3 |

FOREIGN PATENT DOCUMENTS

FR 2 5423514 A 10/1984

OTHER PUBLICATIONS

Patent Abstracts of Japan vol. 088, No. 118 (C–226), May 31, 1984 & JP 59 030735 A Feb. 18, 1984.
Patent Abstracts of Japan vol. 1998, No. 113, Nov. 30, 1998 & JP 10 226537 A, Aug. 25, 1998.
Information Sheet From Clariant Describing PVA Polymers, Nov. 1998*.

* cited by examiner

Primary Examiner—D. S. Nakarani
(74) Attorney, Agent, or Firm—Striker & Sttenby

(57) ABSTRACT

A method of protecting a glass substrate, especially a display glass or a hard disk blank made from a glass or a glass-ceramic, from unacceptable surface damage and scratches, often leading to glass breakage, during processing and transport, is described. This protective method includes applying a removable protective coating made of at least one polymer layer, or at least one polyvinyl alcohol layer, to the glass substrates by spraying or rolling the polyvinyl alcohol or a polymer solution of the polymer to be applied in a polar organic solvent, onto the glass substrate, or dipping the substrate into it. Then when the substrate is ready for its end use, the protective coating is removed by washing in water or polar organic solution so that a residue does not remain on it. The glass substrates, protected in this manner have outstanding surface quality and improved hard disk blanks can be economically produced from them.

33 Claims, 1 Drawing Sheet

METHOD OF PROTECTING GLASS SUBSTRATE SURFACES

This is a Continuation-in-Part of application Ser. No. 09/504,607 filed Feb. 15, 2000, now U.S. Pat. No. 6,491,972.

BACKGROUND OF THE INVENTION

1. Field of the Invention

The present invention relates to a method of applying at least one layer of a releasable polymer coating on a glass substrate, especially a display glass and a hard disk blank, as a protective layer. The invention relates to electronic devices having display glass and to the display glass including the protective layer. The invention also relates to hard disk blanks made from glass or glass-ceramics.

2. Prior Art

The term "glass substrate", for the purposes of the present disclosure, means a substrate made from conventional glass or from glass-ceramics. There is a substantial yield problem in the manufacture of glass substrates, especially for display glasses and hard disk blanks, since the glass substrates have defects in the form of scratches and particles because of processing and transport. These scratches or cracks can also cause glass breakage, which is self-destructive when it occurs during processing, since the process must be interrupted in order to clean the machines of any splinters, which would otherwise cause further cracking or scratching.

Glass particles are released during cutting to length and breaking off glass pieces, which are deposited on the glass surfaces as abrasive particles and lead to scratches on the surface during further transport and working. Furthermore edge working after detaching the substrate leads to loading the glass surface with glass particles, which also act as abrasive bodies. Moreover a high pressure water stream is directed on the edges during edge processing to cool and to remove grinding solution.

Methods in which a polymer foil is laminated on both sides are known. These methods have several disadvantages. The protective foil can first be applied after cutting of the glass, which can thus be protected only during transport and edge working. During edge working the protective foil on the edges is partially lifted off the substrate and the grinding slurry collects there. As a result, the glass is damaged. Furthermore in thin glass particularly glass breakage increases because of the required drawing force for removal of the protective foil.

Adhesives are required for laminating the polymer protective layer on the substrate, which cannot always be removed without leaving a residue. The glass surfaces must also be subsequently polished, in order to obtain the required quality. The subsequent polishing is primarily mechanical and of course removes the adhesive residue, but does not produce a microscopically planar surface with optimum surface properties. This latter type of surface is desired especially for display glass and optical special glasses or also hard disk blank, since the polishing method produces minute cracks. The large amount of waste caused by glass breakage during polishing is a grave disadvantage.

A method is disclosed in German Published Patent Application DE 36 15 277 A1, in which flat glass is provided with a crack-resistant splinter-protecting coating. Immediately after manufacture, plastic powder is applied during cooling of the glass, which melts on the glass piece. A base layer and a crack-resistant covering layer are applied to increase the mechanical stability. The splinter-protecting layer made in this way may not be removed again. Furthermore the resulting surface does not have sufficiently good properties for use in displays. Furthermore it is not possible to use this product for hard disk blanks because of the plastic layer.

Japanese Published Patent Application JP-H10226537 describes a method, in which an aqueous protective film is applied, which does not react with the glass (and also contains no alkali salts) and is resistant to moisture. Polyvinyl alcohol solutions in water are used for the protective film. These polyvinyl alcohol solutions contain polyvinyl alcohols, which have an average molecular weight of at most 51,600 g/mol, preferably 25,800 g/mol, and which are partially hydrolyzed, preferably between 55% and 85%. The reasons for the upper limits are as follows: with higher average molecular weight and with hydrolysis degrees at about 95%, the water solubility greatly reduces. At small hydrolysis degree, in contrast, the water solubility increases with increasing hydrolysis degree. A protective film made from polyvinyl alcohol with an average molecular weight less than 50,000 g/mol and a hydrolysis degree between 55% and 85% already is very soluble in water at 30° C. This sort of polyvinyl protective film is removed or dissolved in a very short time during edge working.

An additional method based on a water-soluble polymer-protective film is disclosed in the Patent BE 714,347. In this method a mixture of hydroxyethyl cellulose and dialdehyde in water or a mixture of polyvinyl alcohol and dialdehyde in water is prepared. The dialdeyde acts as a cross-linking agent, which makes the protective film capable of swelling and the adherence of the protective layer on glass is thus reduced. The water solubility of the polymer protective layer is adjusted by mixing the dialdehydes into it. No statement is made regarding the polymerization degree of the preferred polyvinyl alcohol. The hydrolysis degree should be at 85% or higher. It has been shown however that this protective layer is removed when the edges are worked.

SUMMARY OF THE INVENTION

It is an object of the present invention to provide a method, with which the surfaces of glass substrates are protected from destructive cracking and abrasive bodies during manufacture until the last stage of the processing, especially during wet edge working, and in all intervening transport steps, which has as few method steps as possible, which keeps waste to a minimum and guarantees as high as possible surface quality of the end product.

It is also an object of the present invention to provide a display glass, which has excellent surface quality with small manufacturing costs, and to provide an electronic device, which has display glass of this type.

It is another object of the present invention to provide a hard disk blank, which has excellent surface quality with reduced manufacturing costs, and applications for this type of hard disk blank.

According to the protective method of the invention, the glass substrates, especially display glasses or hard disk blanks, are coated with at least one removable protective layer of a polyvinyl alcohol with a molecular weight of greater than or equal to (i.e. not less than) 55,000 g/mol and a hydrolysis degree of greater than or equal to (i.e. not less than) 95% to form a removable protective layer. The at least one dissolvable or removable layer is only poorly soluble in cold water and withstands the wet edge working process. The glass substrate may be coated on only one side or on both sides as required.

The coating may be removed by washing with water at a temperature of 50° C. or higher, especially 60° C. and higher, preferably 70° C. and higher, and most preferably 80° C. and higher. The higher the water temperature, the faster the coating will be removed. The pH value is adjustable arbitrarily within the bounds of the glass resistance to acidic and basic conditions. The coating is rapidly removed in both acidic and basic media.

The original surface quality of the glass substrate surface is preserved by the at least one polyvinyl alcohol layer throughout the entire working process and during transport. The removal of the at least one polyvinyl alcohol layer by washing with water is, on the one hand, performed carefully, so that little glass breakage occurs, even with very thin glass, and on the other hand very thorough, since the at least one polymer layer is completely removed.

The surface quality of the glass would be impaired by microscopic cracks due to additional after-polishing and thus the waste due to broken glass would be increased. The after-polishing is therefore dispensed with for the glass made by the method according to the invention.

It has proven advantageous to employ a polyvinyl alcohol with an average molecular weight greater than or equal to 100,000 g/mol, especially preferably greater than or equal to 150,000 g/mol.

Similarly it as proven advantageous to use polyvinyl alcohol with a hydrolysis degree of greater than or equal to 97.5.

The water solubility of polyvinyl alcohol at room temperature with a high average molecular weight and very high hydrolysis degree is of course extremely poor (quasi-insoluble). In contrast, its water-solubility at high temperatures is very good. Because of that property this very highly polymerized polyvinyl alcohol is especially suitable to protect the glass substrate surface, even during the processing steps occurring in a wet edge treatment, in which the grinding solution is directed in a high pressure water stream for cooling and transporting at the edges.

Due to process engineering considerations it is advantageous to use an aqueous solution for application of the polyvinyl alcohol containing from 1 to 30% by weight, preferably from 1 to 20 percent by weight, and especially preferably from 5 to 10% by weight, of the polyvinyl alcohol.

In a second method according to the invention at least one layer of a polymer which is soluble in polar organic solvent is applied to the glass substrate. Preferably a polar organic solvent, such as an alcohol, ketone or ester, which is commercially available at a low price, is employed as the solvent in this second method. The polymer used for the coating is preferably a polyacrylate polymer, a polyvinylpyrrolidone/polyvinylacetate copolymer or polyvinylcaprolactam polymer.

The polymer coating is preferably again removed with an alcohol, a ketone or an ester and/or an aqueous solution of any of these organic solvents. Isopropanol or ethanol or aqueous solutions are especially preferred.

The original surface quality of the glass substrate surface is protected by the at least one polymer layer, also by the polyvinyl alcohol layer, during the entire working process and during transport. The at least one polymer layer is carefully removed by washing with organic solvents or aqueous solutions, so that little glass breakage occurs, even with very thin glass, but also very thoroughly since it must be completely removed.

Also in this second method the surface quality of the glass would be impaired by microscopic cracks due to additional after-polishing and thus the waste due to broken glass would be increased. The after-polishing is therefore dispensed with for the glass made by the method according to the invention.

In both methods the at least one polymer layer is preferably directly applied after making the glass substrates in order to preserve the surface quality attained during manufacture, before abrasive or dirt particles an reduce it. The application can occur directly at glass drawing.

The thickness of the at least one polymer layer is adjusted between 0.1 and 100 $\mu$m according to the process steps to be performed and the application methods. A layer thickness of from 1 to 15 $\mu$m has proven especially suitable and is preferred.

There are many possibilities for applying the polymer layer. Three preferred methods of application include dipping, rolling and spraying. The dipping is suitable for glasses, which are already pre-cut. The rolling is especially suitable for thick panels. The spraying, in contrast, is preferred for application of thin layers and especially for glasses, which should have the highest surface quality and thus should be still coated in glass drawing. Furthermore the spraying occurs without contact, so that contamination of the glass substrate surfaces is kept as low as possible. Preferably the high-volume low-pressure (HVLP) method is used, in order to produce as uniform a film as possible, and to keep the over spray, i.e. the excess spray fog or cloud to a minimum.

In as much as the glass piece or strip is not coated under warm conditions (e.g. 90° C.), the drying process must be assisted. For that purpose either infrared or hot air can be employed. In both methods the glass is heated to a temperature of about 150° C. The higher temperatures can lead to a modification of the protective layer or the glass. Lower temperatures, on the other hand, reduce the drying speed.

During infrared heating the glass is heated by radiation. Radiation in the wavelength range between 3 and 10 $\mu$m has proven especially suitable, such as that from a glass black body radiator. Alternatively an electrically heated radiator can be employed.

During hot air drying hot air is directed on both sides of the glass strip or band. The dryer can also be constructed as a floating drier, so that the glass strip floats in the airflow and the drying occurs without contacting the glass strip or band.

If the coating should be removed in a shortest possible time, it is preferably to assist the washing by application of ultrasound waves. Thus the ultrasonic waves are propagated in the wash fluid and the coating is immediately loosened mechanically.

In a preferred embodiment a polymer layer, which is based on polyvinyl alcohol or a polymer which is soluble in polar organic solvent, is applied exactly on the glass substrate surface to be protected. Because of that the effort and expense of the process steps are reduced.

In special cases, in which the requirements for the protective layer are high, at least two polymer layers are preferably applied, which differ in their respective solubility, so that the layer applied to the glass substrate is more soluble than the layer applied over it.

In a preferred embodiment a first layer based on polyvinyl alcohol is applied to the glass substrate and a layer, preferably of a polyacrylate polymer, is applied over it. This has the advantage that the surface coating is very resistant to water and moisture, but also requires significantly less organic solvent for removal of the coating, than when equal thickness layers of polyacrylate polymer, or a similar waterinsoluble polymer, are used. This provides an environmentally more friendly method, which stresses the environment less.

The invention also includes display glasses, which are not polished, and electronic devices, which are equipped with these display glasses. Furthermore the invention includes display glass, whose protective coating can be removed with polar organic solvent or water at temperatures greater than or equal to 50° C. or aqueous solutions of polar organic solvents.

The invention also extends to hard disk blanks made from glass or glass-ceramics that are polished at no time point. Furthermore the invention includes hard disk blanks whose coating can be removed with polar organic solvents or water at temperatures greater than or equal to 50° C. or aqueous solutions of polar organic solvents. The invention also includes hard disk blanks for use in electronic devices.

BRIEF DESCRIPTION OF THE DRAWING

The objects, features and advantages of the process according to the invention will now be illustrated in more detail with the aid of the following description of the preferred embodiments and examples, with reference to the accompanying figures in which.

DESCRIPTION OF THE PREFERRED EMBODIMENTS

An example of a process for making the display glass and processing it integrated with the coating method according to the invention is described in the following and illustrated in FIGS. 1 to 4.

Figure 1:
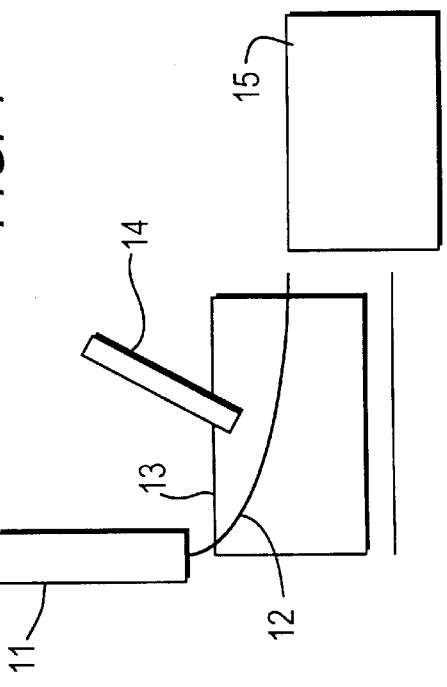
FIG. 1 is a diagrammatic view of illustrating the steps of hot glass manufacture, spray application of the protective layer and drying of the protective layer.

As shown in FIG. 1, the glass itself is first fabricated in a down drawing step. The glass strip 12 comes out vertically downward from the drawing shaft 11 and is immediately conducted into a coating module 13, in which the glass strip 12 is coated by spraying and the protective layer applied on it is immediately dried. During the application of the coating by the coating module 13 the glass strip 12 is guided by the guide unit 14, so that the glass strip 12 issues horizontally from the coating module 13 and thus can be deposited on the table 15.

Then the step of cutting occurs, in which first the borders due to the manufacturing conditions are cut away and then the glass strip is cut into individual panels.

Figure 2:
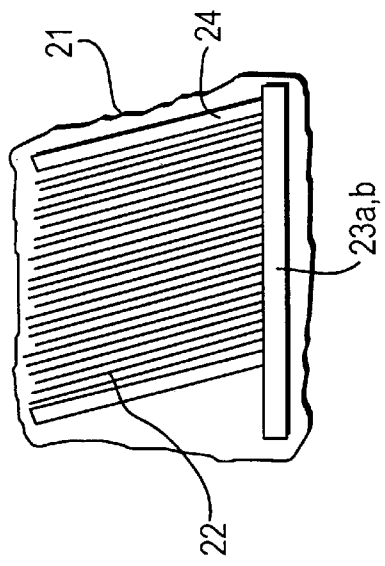
FIG. 2 is a diagrammatic view showing cutting and packing steps.

The glass panels 22 obtained as described above are then packaged for transport to another location as shown in FIG. 2. Also the individually coated glass panels 22 are stacked on two base plates 23a,b, a cover plate 24 is placed over them and the entire stack is packed for additional protection in a metallized LDPE (low density polyethylene) foil 21 for additional protection against moisture and dirt particles.

Figure 3:
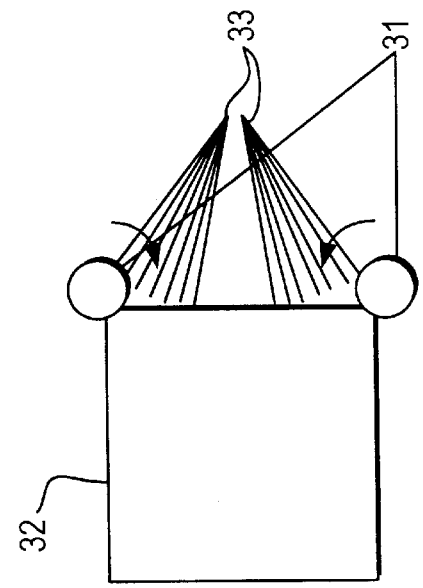
FIG. 3 is a diagrammatic view illustrating transport, unpacking and edge working operations.

At the assigned location the glass panels are unpacked and as shown in FIG. 3 the edges are processed. Also coated glass panels 32 are each guided by oppositely rotating grinding wheels 31 for working the opposite edges of the glass panels. Two water streams 33 are directed to the edges for cooling and feeding grinding solution on them. The edges are ground immediately by action of the grinding wheels 31 together with the grinding solution. The grinding acts to stabilize the glass panels from glass breakage and to make their handling easier for display manufacture.

Figure 4:
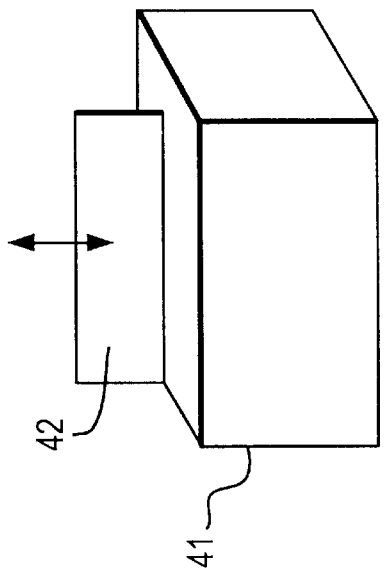
FIG. 4 is a diagrammatic view illustrating removal of the coating and unpacking and supply of the display glass.

In FIG. 4 the step of removing the coating from the glass panel 42 prior to repackaging and supply is illustrated. It is dipped in an ultrasonic vessel filled with a liquid, in order to wash away the protective layer from the now fabricated display glass panel 42.

Similar to the above-described example hard disk blanks made from glass can also be prepared and processed according to the method of the present invention. Also the coating process according to the present invention guarantees the surface quality of the hard disk blanks.

Specific examples of the coating and coating removal methods of the present invention are now set forth in detail in the following paragraphs. These examples include:

Example 1: Use of a polyvinyl alcohol (MW=60,000 g/mol) as a spray solution;

Example 2: Use of a polyvinyl alcohol (MW=150,000 g/mol) as a spray solution;

Example 3: Use of a polyvinyl caprolactam solution as a spray solution;

Example 4: Use of a polyvinyl pyrrolidone-polyvinylacetate copolymer solution as a spray solution;

Example 5: Use of an organic polyacrylate solution as a spray solution;

Example 6: Use of a polyvinyl alcohol solution (MW=130,000 g/mol) as a roll-on solution;

Example 7: Use of a polyvinyl alcohol solution (MW=150,000 g/mol) as a roll-on solution; and Example 8: Use of a polyvinyl alcohol solution (MW=150,000 g/mol) as a dipping solution.

1. USE OF A POLYVINYL ALCOHOL (MW=60,000) AS SPRAY SOLUTION

A polyvinyl alcohol with a molecular weight of about 60,000 g/mol (as measured by gel permeation chromatography, as in the following examples) and a hydrolysis degree of 98% is used.It has a viscosity of 10±1 mPa.s in a 4% aqueous solution at 20° C.(as measured with a falling ball viscometer, also viscosity is measured with this particular viscometer, unless otherwise stated, in the following examples). A 10% solution is used for the processing. It is made in the following manner: one part by weight polymer powder is introduced into nine parts by weight cold deionized water. The resulting suspension is heated with stirring at temperatures greater than 90° C. until the polymer is completely dissolved. After it has completely dissolved, the solution is cooled to room temperature with stirring.

A coating is applied to both sides of an 0.4 mm thick piece of AF 37 glass (alkali-free display glass with a thermal expansion coefficient of 37) by spraying with the above-described solution, which was heated to 70° C., according to the HVLP method with air heated at 70° C. directly on the cold end of the down-draw glass piece at a drawing speed of 1.5 m/min. The nozzle orifice diameter was 0.7 mm, the pressure of the forced air was 5.5 bar. The polymer solution is sprayed at a flow rate of 16 ml/min at a glass piece area of width about 1 m with a pressure of 0.5 bar.

The drying takes place with heated air, so that a rapid drying (less than 60 s) results. In this drying method hotter air is directed at both sides of the glass strip. The drying apparatus can be a floating dryer, so that the glass piece or strip is held floating in the airflow and the drying takes place without contact with it. The layer thickness amounts to between 5 and 6 µm. Glass panels or strips are exposed to cold water for several minutes during the edge processing. This cold water reaches the edge region of the glass panel or strip being treated in a stream with about a 2 bar pressure and rinses the entire surface. The coating removal occurs by washing the panel or strip immediately after the edge processing in hot deionized water (5 min, 80° C., ultrasound-assisted).

2. USE OF A POLYVINYL ALCOHOL (MW=150, 000) AS SPRAY SOLUTION

A polyvinyl alcohol with a molecular weight of about 150,000 g/mol and a hydrolysis degree of 99% is used. It has a viscosity of 28±1 mPa.s in a 4% aqueous solution at 20° C. A 5% solution is used for the processing. It is made in the following manner: one part by weight polymer powder is introduced into nineteen parts by weight cold deionized water. The resulting suspension is heated with stirring at temperatures greater than 90° C. until the polymer is completely dissolved. After it has completely dissolved, the solution is cooled to room temperature with stirring.

A coating is applied to both sides of an 0.7 mm thick piece of AF 37 glass by spraying with-the above-described solution, which was heated to 70° C., according to the HVLP method with air heated at 70° C. directly on the cold end of the down-draw glass piece at a drawing speed of 1.5 m/min. The nozzle orifice diameter was 0.9 mm, the pressure of the forced air was 5.5 bar. The polymer solution is sprayed at a flow rate of 16 ml/min at a glass piece area of width about 1 m with a pressure of 0.4 bar.

The drying takes place by irradiation with a gas infrared radiator, so that a rapid drying (less than 60 s)results. In this drying method the glass is heated by the radiation. Radiation having wavelengths in a range between 3 and 10 µm is especially preferred. A black body radiator, for example, may produce this infrared radiation. Alternatively, an electrical radiator can be employed. The layer thickness amounts to between 5 and 6 µm. The glass panels or strips are exposed to cold water for several minutes during the edge processing. This cold water reaches the edge region of the glass panel or strip being treated in a stream with about a 2 bar pressure and rinses the entire surface. The coating removal occurs by washing the panel or strip immediately with aqueous media after the edge processing with hot deionized water at pH=5, adjusted with citric acid (5 min, 60° C., ultrasound-assisted).

3. USE OF A POLYVINYL CAPROLACTAM SOLUTION AS SPRAY SOLUTION

A 20% by weight polyvinyl caprolactam solution in ethanol is used. The average molecular weight of the polyacrylate amounts to about 100,000 g/mol. The viscosity of the 20% solution amounts to 50 to 120±1 mPa.s (as measured with Brookfield LVT at 23° C. and 60 revolutions per minute). The coating was applied to both sides of an 0.8 mm thick piece of AF 37 glass by spraying with the above-described solution at room temperature according to the HVLP method directly on the cold end of the drawn-down glass piece at a drawing speed of 1.5 m/min. The coating was applied to both sides of an 0.4 mm thick piece of AF 37 glass by spraying with the above-described solution heated to 40° C. according to the HVLP method with air heated at 40° C. directly on the cold end of the drawn-down glass piece at a drawing speed of 1.5 m/min. The nozzle orifice diameter was 0.7 mm, the pressure of the forced air was 5.0 bar. The polymer solution is sprayed at a flow rate of 18 ml/min at a glass piece area of width about 1 m with a pressure of 0.45 bar.

The drying occurs in an airflow within about 30 s. The layer thickness amounts to between 5, and 6 µm.

The glass panels or strips are exposed to cold water for several minutes during the edge processing. This cold water reaches the edge region of the glass panel or strip being treated in a stream with about a 2 bar pressure and rinses the entire surface. The protective layer is easily dissolved, but remains otherwise not effected.

The removal of the layer occurs by washing the panel or piece in a mixture of ethanol/water with a volume ratio of 7:3 at 40° C. with ultrasonic assistance for about 8 minutes.

4. USE OF A POLYVINYLPYRROLIDONE-POLYVINYLACETATE COPOLYMER SOLUTION AS SPRAY SOLUTION

A 20% by weight solution of a copolymer polyvinylpyrrolidone/polyvinylacetate (3:7, viscosity about 55 mPa.s at 23° C.) in isopropanol was used. The coating was applied to both sides of an 0.8 mm thick piece of AF 37 glass by spraying with the above-described solution at room temperature according to the HVLP method directly on the cold end of the drawn-down glass piece at a drawing speed of 1.5 m/min. The nozzle orifice diameter was 0.7 mm, the pressure of the forced air was 6 bar. The polymer solution is sprayed at a flow rate of 18 ml/min at a glass piece area of width about 1 m with a pressure of 0.4 bar.

The drying occurs in an airflow within about 30 s. The layer thickness amounts to between 5 and 6 µm.

The glass panels or strips are exposed to cold water for several minutes during the edge processing. This cold water reaches the edge region of the glass panel or strip being treated in a stream with about a 2 bar pressure and rinses the entire surface. The protective layer remains uneffected.

The removal of the layer occurs by washing the panel or piece in a mixture of isopropanol and water at 30° C. with ultrasonic assistance for about 5 minutes.

5. USE OF AN ORGANIC POLYACRYLATE SOLUTION AS SPRAY SOLUTION

A 35% by weight polyacrylate solution in ethanol is used. The solution has a an outflow time of 12 s at 23° C. (DIN 53211). The coating was applied to both sides of an 0.8 mm thick piece of AF 37 glass by spraying with the above-described solution at room temperature according to the HVLP method directly on the cold end of the drawn-down glass piece at a drawing speed of 1.5 m/min. The nozzle orifice for the spraying nozzle had a diameter of 0.43 mm, the pressure of the forced air was 5 bar. The polymer solution is sprayed at a flow rate of 12 ml/min at a glass piece area of width about 1 m with a pressure of 0.3 bar.

The drying occurs in an airflow within about 20 s. The layer thickness amounts to between 5 and 6 µm.

The glass panels or strips are exposed to cold water for several minutes during the edge processing. This cold water reaches the edge region of the glass panel or strip being treated in a stream with about a 2 bar pressure and rinses the entire surface. The protective layer remains unaffected.

The removal of the layer occurs by washing the panel or piece in isopropanol at 50° C. with ultrasonic assistance for about 5 minutes.

6. USE OF A POLYVINYL ALCOHOL (MW 130,000) AS A ROLL-ON SOLUTION

A polyvinyl alcohol with a molecular weight of about 130,000 g/mol and a hydrolysis degree of 97% is used. It has a viscosity of 18±1 mPa.s in a 4% aqueous solution at 20° C. A 20% solution is used for the processing. It is made in the following manner: one part by weight polymer powder is introduced into four parts by weight cold deionized water. The resulting suspension is heated with stirring at temperatures greater than 90° C. until the polymer is completely dissolved. After it has completely dissolved, the solution is cooled to room temperature with stirring.

A coating is applied to both sides of an 0.7 mm thick piece of AF 37 glass by rolling the cold and thus highly viscous polymer solution on a glass strip area of width 1 m in the region between the edges of the glass piece or strip.

The drying occurs by irradiation with a gas infrared radiator, so that a rapid drying (less than 60 s) results. The layer thickness amounts to between 10 and 12 $\mu$m. The coating is removed by washing for eight minutes with deionized water (pH=13, adjusted with tetramethyl ammonium hydroxide (TMAH) at a temperature of 60° C.

7. USE OF A POLYVINYL ALCOHOL (MW=150,000) AS A ROLL-ON SOLUTION

A polyvinyl alcohol with a molecular weight of about 15,000 g/mol and a hydrolysis degree of 99% is used. It has a viscosity of 28±1 mPa.s in a 4% aqueous solution at 20° C. A 10% solution is used in the process. It is made in the following manner: one part by weight polymer powder is introduced into nine parts by weight cold deionized water. The resulting suspension is heated with stirring at temperatures greater than 90° C. until the polymer is completely dissolved. After it has completely dissolved, the solution is cooled to room temperature with stirring.

A coating is applied to both sides of an 0.7 mm thick piece of AF 37 glass by rolling the cold and thus highly viscous polymer solution on a glass strip area of width 1 m in the region between the edges of the glass piece or strip.

The drying occurs by irradiation with a gas infrared radiator, so that a rapid drying (less than 60 s) results. The layer thickness amounts to between 8 and 10 $\mu$m. The coating is removed by washing for eight minutes with deionized water (pH=13, adjusted with tetramethylammonium hydroxide (TMAH) at a temperature of 60° C.

8. USE OF A POLYVINYL ALCOHOL (MW=150,000) AS A DIPPING SOLUTION

A polyvinyl alcohol with a molecular weight of about 150,000 g/mol and a hydrolysis degree of 99% is used. It has a viscosity of 28±1 mPa.s in a 4% aqueous solution at 20° C. A 5% solution is used in the process. It is made in the following manner: one part by weight polymer powder is introduced into 19 parts by weight cold deionized water. The resulting suspension is heated with stirring at temperatures greater than 90° C. until the polymer is completely dissolved. After it has completely dissolved, the solution is cooled to room temperature with stirring.

A coating is applied to both sides of a 0.7 mm thick piece of AF 37 glass by dipping then glass in the cold polymer solution. A layer thickness in the range of from 8 $\mu$m results.

The drying occurs in an IR oven with an infrared black body radiator for about 2 min with a surface temperature of the radiating area of about 250° C. The washing occurs in hot deionized water at a temperature of 70° C.

The disclosure in German Patent Application 199 06 333.8-45 of Feb. 16, 1999 is incorporated hereby reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of protecting glass substrate surfaces, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A method of providing a removable protective coating on a glass substrate and of later removing said removable protective coating from said glass substrate, said method comprising the steps of:
   a) applying a polyvinyl alcohol with a molecular weight of not less than about 60,000 g/mole and a hydrolysis degree of not less than 95% to said glass substrate to form a polyvinyl alcohol layer on said glass substrate; and
   b) drying said glass substrate provided with said polyvinyl alcohol layer by heating at temperatures of about 150° C. or less, in order to form said removable protective coating on said glass substrate.

2. The method as defined in claim 1, further comprising dissolving said polyvinyl alcohol layer with water at a temperature not less than 50° C., after the applying and the drying, in order to remove said removable protective coating from said glass substrate.

3. The method as defined in claim 1, wherein said polyvinyl alcohol has an average molecular weight of not less than 150,000 g/mol.

4. The method as defined in claim 1, wherein said hydrolysis degree of said polyvinyl alcohol is not less than 97.5%.

5. The method as defined in claim 1, wherein said polyvinyl alcohol is applied during the applying as a 1 to 30% by weight polyvinyl alcohol solution.

6. A method of providing a removable protective coating on a glass substrate and of later removing said removable protective coating from said glass substrate, said method comprising applying a polymer solution of a polymer in a polar organic solvent to said glass substrate to form a polymer layer on said glass substrate;
   wherein said polymer is selected from the group consisting of polyacrylate polymers, polyvinylpyrrolidone/polyvinyl acetate copolymers and polyvinyl caprolactam polymers.

7. The method as defined in claim 6, wherein said polar organic solvent for the polymer solution applied during the applying is selected from the group consisting of alcohols, ketones and esters.

8. The method as defined in claim 6, further comprising removing said coating from said glass substrate by washing with a wash liquid comprising a polar organic solvent or an aqueous solution of said polar organic solvent, in order to remove said polymer layer from said glass substrate.

9. The method as defined in claim 8, wherein said polar organic solvent included in said wash liquid is selected from the group consisting of alcohols, ketones and esters.

10. The method as defined in claim 8, wherein said polar organic solvent included in said wash liquid is selected from the group consisting of ethanol and isopropanol.

11. The method as defined in claim 8, wherein said washing is ultrasound-assisted.

12. The method as defined in claim 1 or 6, wherein the applying of the polyvinyl alcohol or the polymer solution occurs immediately after making said glass substrate.

13. The method as defined in claim 1 or 6, wherein said polyvinyl alcohol layer or said polymer layer has a thickness of from 0.1 to 100 µm.

14. The method as defined in claim 1 or 6, wherein said applying of said polyvinyl alcohol or said polymer solution to said glass substrate occurs by dipping of said glass substrate into said polyvinyl alcohol or said polymer solution.

15. The method as defined in claim 1 or 6, wherein said applying of said polyvinyl alcohol or said polymer solution to said glass substrate occurs by rolling of said polyvinyl alcohol or said polymer solution onto said glass substrate.

16. The method as defined in claim 1 or 6, wherein said applying of said polyvinyl alcohol or said polymer solution to said glass substrate occurs by spraying said polyvinyl alcohol or said polymer solution onto said glass substrate.

17. The method as defined in claim 1 or 6, wherein said applying of said polyvinyl alcohol or said polymer solution to said glass substrate occurs by spraying said polyvinyl alcohol or said polymer solution onto said glass substrate in a high-volume low-pressure process.

18. The method as defined in claim 1 or 6, wherein said applying of said polyvinyl alcohol or said polymer solution to said glass substrate, occurs by spraying said polyvinyl alcohol or said polymer solution onto said glass substrate in a high-volume low-pressure process during drawing of said glass substrate.

19. The method as defined in claim 1 or 6, wherein said drying comprises infrared assisted drying of said polyvinyl alcohol layer or said polymer layer.

20. The method as defined in claim 1 or 6, wherein said polyvinyl alcohol layer or said polymer layer is dried in a floating dryer with hot air.

21. The method as defined in claim 1 or 6, wherein said polyvinyl layer or said polymer layer is applied just to surfaces of said glass substrate requiring protection during processing steps taking place between the providing and the later removing.

22. A method of providing, and of later removing, a removable protective coating on a glass substrate, said removable protective coating comprising at least two polymer layers, wherein each of said at least two polymer layers differ in water-solubility, said method comprising the steps of:
   a) applying a polyvinyl alcohol having a molecular weight of not less than about 60,000 g/mol and a hydrolysis degree of not less than 95% to said glass substrate and drying said glass substrate with said polyvinyl alcohol thereon by heating at temperatures of about 150° C. or less, to form a first polymer layer on said glass substrate; and then
   b) applying a polymer compound that is soluble in a polar organic solvent over said first polymer layer to form another of said at least two polymer layers, said first polymer layer having a solubility greater than said another of said at least two polymer layers.

23. A method of providing a removable protective coating on a glass substrate and of later removing said removable protective coating from said glass substrate, said method comprising the steps of:
   a) applying to said glass substrate an aqueous solution containing from 5 to 20 percent by weight of polyvinyl alcohol having a hydrolysis degree greater than or equal to 95% in order to form a polyvinyl alcohol layer on said glass substrate; and
   b) drying said glass substrate provided with said polyvinyl alcohol layer by heating at temperatures of about 150° C. or less, in order to form said removable protective coating on said glass substrate;
   wherein a four-percent-by-weight aqueous solution of said polyvinyl alcohol has a viscosity within a predetermined viscosity range of 10±1 mPa to 28±1 mPa, as measured at 20° C. by means of a falling ball viscometer.

24. The method as defined in claim 23, further comprising dissolving said polyvinyl alcohol layer with water at a temperature of not less than 50° C., in order to remove said removable protective coating from said glass substrate.

25. The method as defined in claim 23, wherein said hydrolysis degree of said polyvinyl alcohol is not less than 97.5%.

26. The method as defined in claim 23, wherein said four percent by weight aqueous solution of said polyvinyl alcohol has viscosity of 28±1 mPa.

27. A method of providing, and of later removing, a removable protective coating on a glass substrate, said removable protective coating comprising at least two polymer layers, wherein each of said at least two polymer layers differ in water-solubility, said method comprising the steps of:
   a) applying to said glass substrate an aqueous solution containing from 5 to 20 percent by weight of polyvinyl alcohol having a hydrolysis degree greater than or equal to 95% in order to form a polyvinyl alcohol layer on said glass substrate, and drying said glass substrate with said polyvinyl alcohol thereon by heating at temperatures of about 150° C. or less, to form a first polymer layer on said glass substrate; and then
   b) applying a polymer compound that is soluble in a polar organic solvent over said first polymer layer to form another of said at least two polymer layers, said first polymer layer having a solubility greater than said another of said at least two polymer layers;
   wherein a four-percent-by-weight aqueous solution of said polyvinyl alcohol has a viscosity within a predetermined viscosity range of 10±1 mPa to 28±1 mPa, as measured at 20° C. by means of a falling ball viscometer.

28. A display glass for an electronic unit, wherein said display glass is protected during processing and transport by a protective method, said protective method comprising the steps of:
   a) applying a polyvinyl alcohol with a molecular weight of not less than about 60,000 g/mol and a hydrolysis degree of not less than 95% to said display glass and drying said display glass with said polyvinyl alcohol thereon by heating at temperatures of about 150° C. or less, to form at least one polyvinyl alcohol layer on said display glass as a protective coating for protecting a surface of said display glass prior to incorporation of said display glass in said electronic unit; and
   b) when said display glass is to be incorporated in said electronic unit, removing said protective coating from said display glass by washing with a wash liquid, said wash liquid comprising a polar organic solvent or an aqueous solution of the polar organic solvent, in order to remove said at least one polyvinyl alcohol layer from said display glass;

wherein no polishing of said display glass takes place before, during and after processing and transport so that microscopic cracks introduced by said polishing are eliminated.

29. A display glass for an electronic unit, wherein said display glass is protected during processing and transport by a protective method, said protective method comprising the steps of:
   a) applying a polymer solution of a polymer in a polar organic solvent to form at least one polymer layer on said display glass as a protective coating for protecting a surface of said display glass prior to incorporation of said display glass in said electronic unit, wherein said polymer is selected from the group consisting of polyacrylate polymers, polyvinylpyrrolidone/polyvinyl acetate copolymers and polyvinyl caprolactam polymers; and,
   b) when said display glass is to be incorporated in said electronic unit, removing said protective coating from said display glass by washing with a wash liquid, said wash liquid comprising a polar organic solvent or an aqueous solution of the polar organic solvent, in order to remove said at least one polymer layer from said display glass;
   whereby no polishing of said display glass takes place before, during and after processing and transport.

30. A display glass for an electronic unit, wherein said display glass is protected during processing and transport by a protective method, said protective method comprising the steps of:
   a) applying to said display glass an aqueous solution containing from 5 to 20 percent by weight of polyvinyl alcohol having a hydrolysis degree greater than or equal to 95% to form at least one polyvinyl alcohol layer on said display glass as a protective coating for protecting a surface of said display glass prior to incorporation of said display glass in said electronic unit; and
   b) when said display glass is to be incorporated in said electronic unit, removing said protective coating from said display glass by washing with a wash liquid, said wash liquid comprising a polar organic solvent or an aqueous solution of the polar organic solvent, in order to remove said at least one polyvinyl alcohol layer from said display glass;
   wherein no polishing of said display glass takes place before, during and after processing and transport so that microscopic cracks introduced by said polishing are eliminated, and a four-percent-by-weight aqueous solution of said polyvinyl alcohol has a viscosity within a predetermined viscosity range of 10±1 mPa to 28±1 mPa, as measured at 20° C. by means of a falling ball viscometer.

31. A hard disk blank for a hard disk of an electronic unit made from a glass or glass-ceramic, wherein said hard disk blank is protected during processing and transport by a protective method, said protective method comprising the steps of:
   a) applying a polyvinyl alcohol with a molecular weight of not less than about 60,000 g/mol and a hydrolysis degree of not less than 95% to said hard disk blank and drying said hard disk blank with said polyvinyl alcohol thereon by heating at temperatures of about 150° C. or less, to form at least one polyvinyl alcohol layer on said hard disk blank as a protective coating for protecting said hard disk blank prior to making said hard disk; and,
   b) immediately prior to making said hard disk, removing said protective coating from said hard disk blank by washing with a wash liquid, said wash liquid comprising water at a temperature not less than 50° C., a polar organic solvent or an aqueous solution of the polar organic solvent, in order to remove said at least one polyvinyl alcohol layer from said hard disk blank;
   wherein no polishing of said hard disk blank takes place before, during and after processing and transport so that microscopic cracks introduced by said polishing are eliminated.

32. A hard disk blank for a hard disk of an electrical unit made from a glass or glass-ceramic, which is protected during processing and transport by a protective method, said protective method comprising the steps of:
   a) applying a polymer solution of a polymer in a polar organic solvent to form at least one polymer layer on said hard disk blank as a protective coating for protecting a surface of said hard disk blank prior to making the hard disk blank, wherein said polymer is selected from the group consisting of polyacrylate polymers, polyvinylpyrrolidone/polyvinyl acetate copolymers and polyvinyl caprolactam polymers; and,
   b) when said hard disk is to be made from the hard disk blank, removing said protective coating from said hard disk blank by washing with a wash liquid, said wash liquid comprising water at a temperature of not less than 50° C., a polar organic solvent or an aqueous solution of the polar organic solvent, in order to remove said at least one polymer layer from said hard disk blank;
   whereby no polishing of said hard disk blank takes place before, during and after processing and transport.

33. A hard disk blank for a hard disk of an electronic unit made from glass or glass-ceramic, wherein said hard disk blank is protected during processing and transport by a protective method, said protective method comprising the steps of:
   a) applying to said hard disk blank an aqueous solution containing from 5 to 20 percent by weight of polyvinyl alcohol having a hydrolysis degree greater than or equal to 95% in order to form a polyvinyl alcohol layer on said hard disk and drying said hard disk blank with said polyvinyl alcohol thereon by heating at temperatures of about 150° C. or less, to form at least one polyvinyl alcohol layer on said hard disk blank as a protective coating for protecting said hard disk blank prior to making said hard disk; and,
   b) immediately prior to making said hard disk, removing said protective coating from said hard disk blank by washing with a wash liquid, said wash liquid comprising water at a temperature not less than 50° C., a polar organic solvent or an aqueous solution of the polar organic solvent, in order to remove said at least one polyvinyl alcohol layer from said hard disk blank;
   wherein no polishing of said hard disk blank takes place before, during and after processing and transport so that microscopic cracks introduced by said polishing are eliminated, and a four-percent-by-weight aqueous solution of said polyvinyl alcohol has a viscosity within a predetermined viscosity range of 10±1 mPa to 28±1 mPa, as measured at 20° C. by means of a falling ball viscometer.

* * * * *